A. J. GOVE.
FAUCET.
No. 35,094.
Patented Apr. 29, 1862.
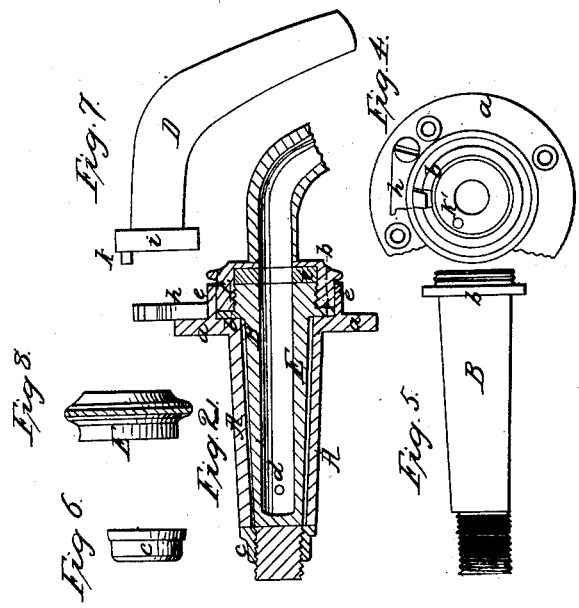
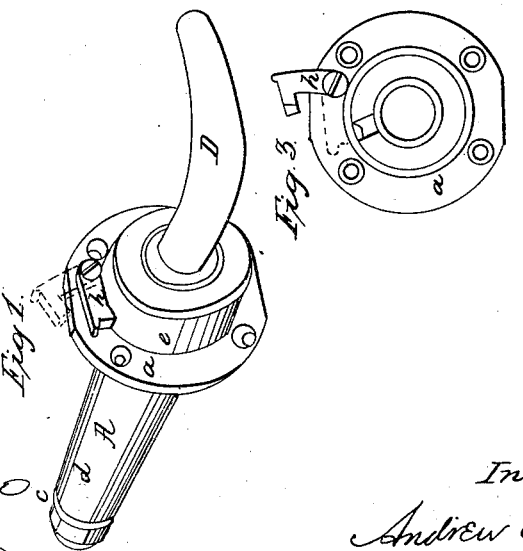
Witnesses:
Inventor:

UNITED STATES PATENT OFFICE.

ANDREW J. GOVE, OF SAN FRANCISCO, CALIFORNIA.

FAUCET.

Specification of Letters Patent No. 35,094, dated April 29, 1862.

*To all whom it may concern:*

Be it known that I, A. J. GOVE, of the city and county of San Francisco and State of California, have invented a new and Improved Tap for Beer-Barrels; and I do hereby declare that the following is a full, clear, and exact description of the construction and operation of the same, reference being had to the annexed drawings, making a part of this specification, in which—

Figure 1, is a perspective view; Fig. 2, is a sectional view; Figs. 3, and 4, are end views; Figs. 5, 6, 7, and 8, represent different parts.

A, is a hollow truncated cone, with a flange $a$, B, is another hollow truncated cone, made so as to fit air and water-tight inside of cone A, and is also provided with a flange $b$, which fits inside of a collar $e$, on flange $a$; A, and B, are provided with corresponding apertures $d$, and are to be fastened together by the nut C, thus forming a stop-cock or bung; the flange $b$, has a notch in it, as shown in Fig. 4, into which fits the catch $h$, when the stop-cock or bung is closed.

D, is a nozzle, provided with a flange $i$, and pin $k$, as shown in Fig. 7.

E, is a coupling to connect the nozzle D, with the bung.

Operation: The bung formed by A, B, and C, is to be inserted in a cask, either by means of the flange $a$, or by a screw thread cut upon the cone A; when the cask is to be filled, the bung should be closed, and the catch $h$, let into the notch in flange $b$; the cask then being placed into position for use, the nozzle D, should be attached to flange $b$, by inserting the pin $k$, in a hole in flange $b$, as shown at $k'$, the coupling E, passed over the nozzle against the flange $i$, and screwed upon the cone B, as shown in Fig. 2; the bung is then opened or shut by turning the nozzle down or up; when the cask is to be sent away to be filled, the nozzle should be removed, and its place may be occupied by a cap, for the purpose of keeping out dirt.

The nozzles and bungs should be made so that one nozzle shall fit different bungs.

The object of this invention is to have those parts of the device which form the faucet (the cones A, and B, combined) permanently secured to the cask, one such faucet (consisting of the cones A, and B,) to each cask; and to have a portable nozzle D, which can be attached to any one of the faucets and serves the double purpose of a key for opening the faucet and of a nozzle for the discharge of the liquid. By this means the operation of tapping the casks, is considerably facilitated and the loss of liquid which is unavoidable in the usual mode of tapping casks containing fermenting liquors, is effectually avoided. It will be understood that this device can be used for drawing off liquids of all kinds.

I claim—

The combination of the hollow truncated cones A and B and nozzle, D, the whole being constructed, arranged and operated in the manner substantially as specified, and for the purposes set forth.

ANDREW J. GOVE.

Witnesses:
 CHAS. R. BOND,
 F. J. THIBAULT.